Jan. 7, 1958  G. T. RANDOL  2,818,846
MECHANICAL SELF-ADJUSTING VALVE TAPPET
Filed Feb. 26, 1957  2 Sheets-Sheet 2
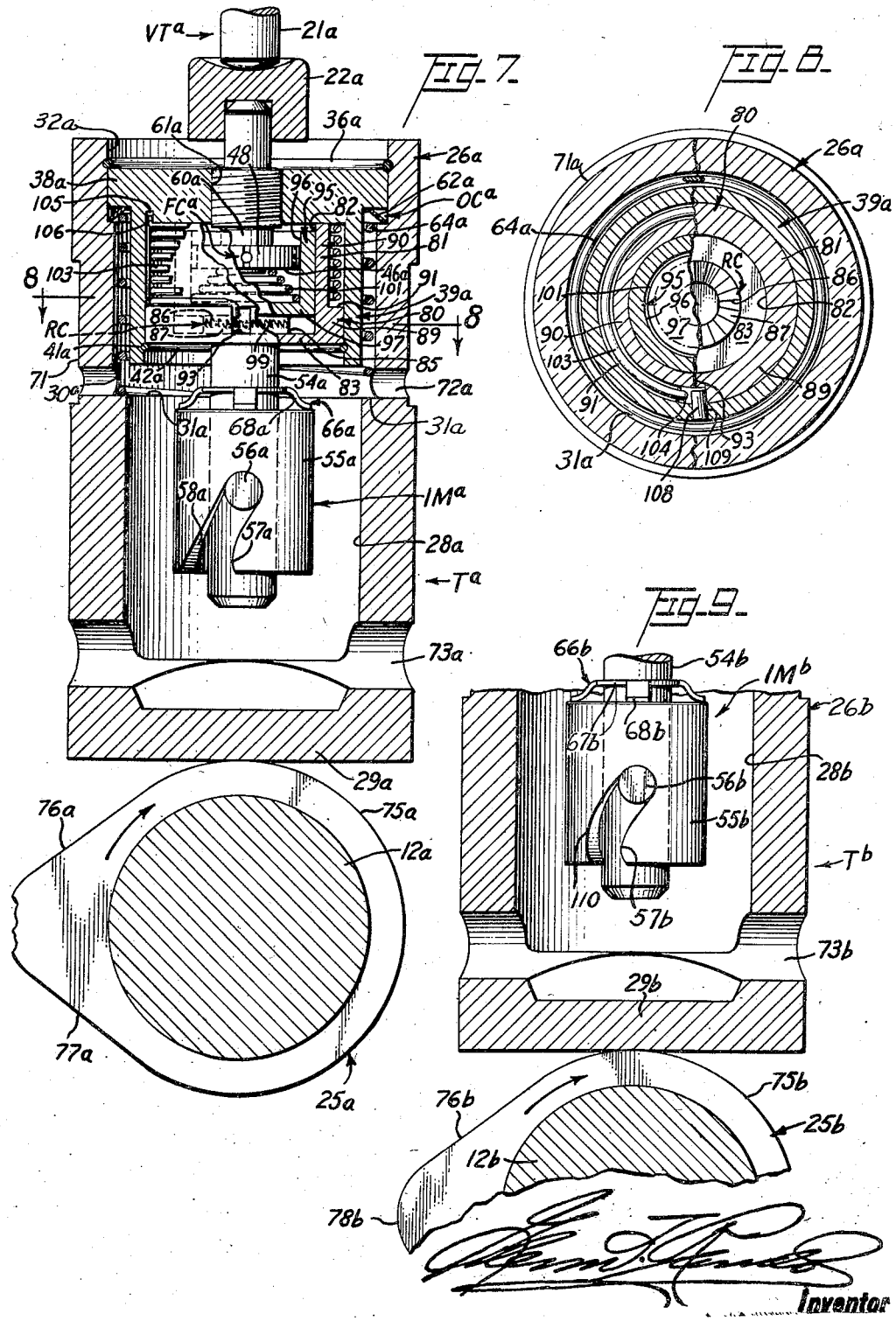
Inventor

United States Patent Office 2,818,846
Patented Jan. 7, 1958

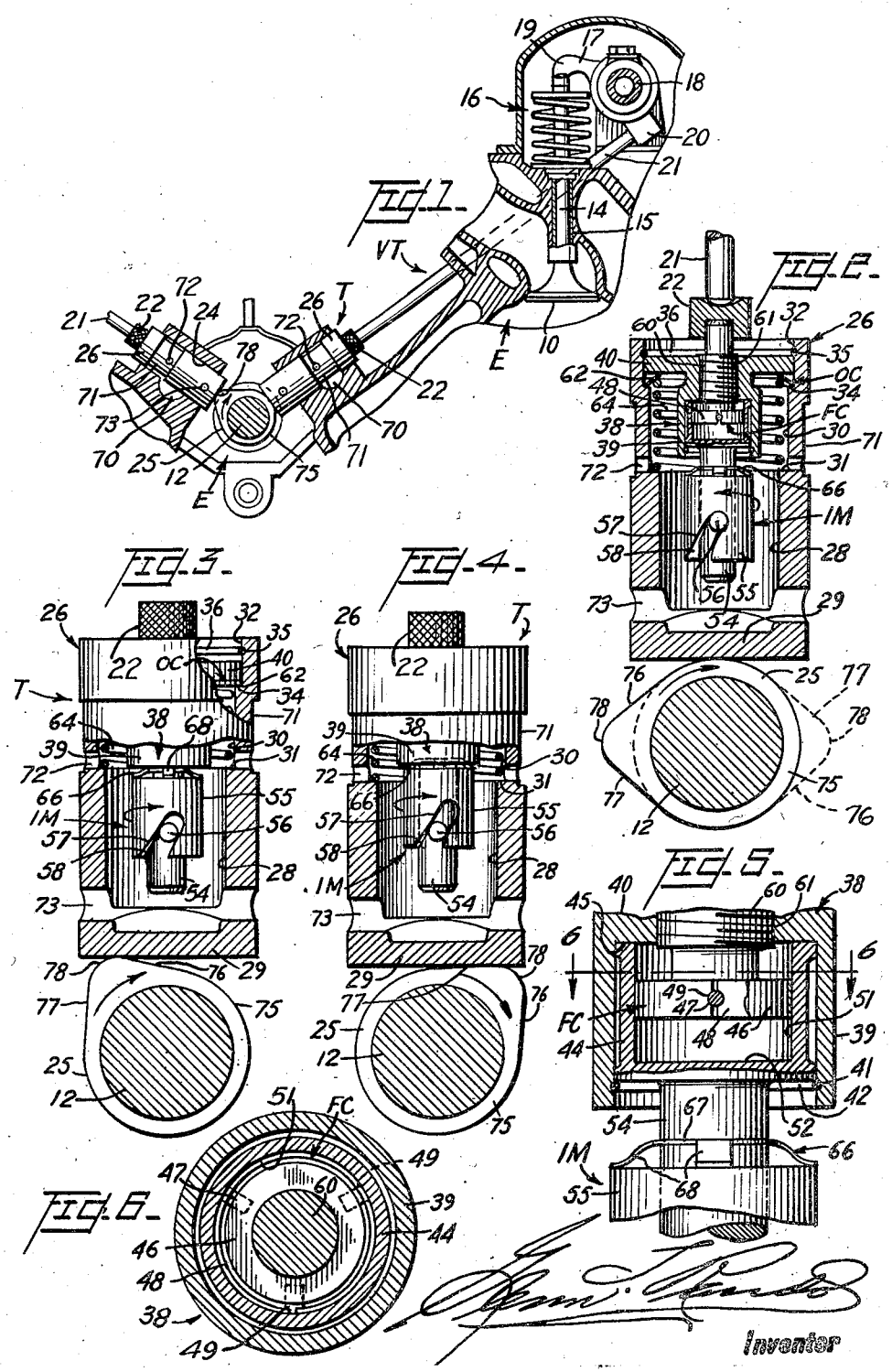

2,818,846

MECHANICAL SELF-ADJUSTING VALVE TAPPET

Glenn T. Randol, Mountain Lake Park, Md.

Application February 26, 1957, Serial No. 642,474

24 Claims. (Cl. 123—90)

The present invention relates to valve tappets or lifters adapted to automatically maintain substantially zero clearance in the valve drive train of an internal-combustion engine. The invention particularly relates to a novel mechanical self-adjusting tappet of improved construction and operation.

The general object of my invention concerns a novel mechanical compensating tappet unit or assembly, operatively disposed, for example, between the stem of a poppet valve and the cam on the engine camshaft, and adapted to take up substantially all backlash or lost-motion which may exist or develop as a result of initial installation or impact wear between the parts comprising the valve-actuating system over and above a requisite "operating clearance" defined by limited relative movement between the principal elements of said assembly without affecting the normal or modulated status of such clearance with the engine valve closed.

More particularly, my invention provides a novel and improved automatically compensating tappet of the mechanical type actuated by a free-floating inertia hammer or weight responsive to the reciprocable motion of the tappet to open and close the engine valve, whereby the tappet body members are elongated only relatively to each other to compensate for any backlash conditions external to the aforesaid "operating clearance" within the tappet, said clearance mechanism including biasing means accommodating two-way adjustments in consequence of thermal changes in the parts and also having coaction with respect to the backlash mechanism to prohibit compensating adjustments by the latter during a valve opening cycle.

An object importantly related to the object next above, is the provision of novel tappet inertia means comprising a sleeve-type weight movably disposed on a cylindrical element, the weight and element being operably connected by means of a helical slot and cooperating pin whereby the weight is given a back and forth twisting motion responsive to reciprocable tappet motion which carries through via the slot and pin connection to the cylindrical element to rotate the element in one direction, or optionally in both directions as the design requires, and wherein in both arrangements backlash adjustments are effected by uni-directional movement of a cooperating adjustable element.

In a preferred embodiment of my invention, novel valve tappet mechanism is provided for incorporation in the valve drive train between the engine valve and camshaft comprising an outer body member or element mounted for sliding movement in the block of the engine, an inner body member or element mounted for sliding movement in and relative to the outer body member, operating clearance mechanism between the body members including an annular flange element carried by the inner body member, a complemental annular shoulder on the outer body member normally spaced from and cooperating with a circular surface marginal portion on the flange, a normally preloaded dished spring washer operatively disposed between the marginal portion and shoulder tending to separate the body members, and a split stop ring engaging an internal annular groove in the outer body member for retaining the flange and shoulder in their operative relationship aforesaid, the inner body member further includes a threaded central aperture, a coaxially disposed inverted cup-shaped element, a telescopically-related cup-shaped driving element having a depending cylindrical stem member, an internal annular groove adjacent the inner end of the inner body cup element, a split retainer ring received by said groove for retaining the two interfitting cup elements in assembled operative relationship, a threaded cylindrical stem element engaging the aperture threads and having a reduced diameter smooth surface portion extending outwardly with the threaded portion terminating inwardly in an annular driven flange having, for example, three radially projecting pins equally spaced circumferentially for engaging a corresponding number of registering apertures in an expansible friction clutch ring to support the latter on said flange for axially movement therewith but accommodating radial movement relative thereto, said clutch ring engaging the inner cylindrical surface of the telescopically-related driving element whereby rotational movement of the friction ring in one direction imparts a like movement to the threaded stem to elevate the same relatively to the inner body member to compensate for backlash only as will appear. The outer body member includes an outer counterbore merging at the shoulder aforesaid with another counterbore which in turn forms an internal annular shoulder with a longitudinal bore terminating at the inner end of the member to form an end wall, the underside of which is acted on by the engine-driven cam to reciprocate the tappet unit as is well understood. A normally preloaded compression spring is operatively disposed between the last-mentioned shoulder and underside marginal portion of the inner body member flange to maintain the upper marginal portion of the flange in engagement with the split stop ring aforesaid when the engine is cold thereby cooperating with the dished spring washer to restore the normal cold-engine "operating clearance" between the body members.

In a modified form of my invention, novel provision is made for utilizing a torsional power spring operatively connecting a primary telescopically-related driving element and the inner body inverted cup element, and which is operatively energized by the downward throw of the inertia hammer to rotate the telescopic element in the opposite direction to compensate for backlash adjustments, said telescopic element including a lost-motion connection with the inverted cup member comprising a slot and pin, the latter being pressfitted in a hole through the wall of said inverted cup element. Novel ratchet one-way clutch means are operably incorporated between a secondary cup-shaped driving member interfitted in the hollow of the telescopic cup, this latter cup being subjected to a twisting motion of the hammer on the depending stem to energize the torsional spring without imparting a like movement to the elevating screw so that upon energization of the torsional spring its unwinding motion is transmitted through the one-way drive ratchet mechanism to thereby turn the secondary cup element, the inner cylindrical surface of which is in frictional engagement with the outer cylindrical surface of the clutch friction ring, to cause a like rotation of the elevating screw if backlash is present in the valve-actuating system external to the "operating clearance" which latter modulates (contracts) due to a hot engine or assumes its normal status if the engine is cold.

In both embodiments of the present invention the inertia hammer is carried on the depending cylindrical stem integral with the primary driving cup-shaped element. Each time the engine cam lobe raises and lowers the tappet unit, the free-floating weight moves up and down respectively, inside the hollow of the outer body member, a pin projecting from the stem and a curved (helical) slot provided in the lower end wall of the weight form a one-way working connection therebetween for imparting a twisting motion to the weight. This twisting action carries through directly to the screw via the friction clutch means (first embodiment) or indirectly to the screw via the ratchet one-way clutch means thence to the friction clutch means (second embodiment) from the energized torsional spring, to turn it and automatically lengthen the tappet assembly to adjust to any changes necessary in the valve-actuating system resulting from wear between the parts thereof, the changes required as a result of thermal conditions of the engine are compensated for by modulation of the "operating clearance" mechanism. The twisting action imparted by the weight is in the same direction for both embodiments, but in the modified structure the screw is elevated in a direction opposite to the twisting movement of the weight to energize the spring, by the unwinding action of the energized torsional power spring.

It is another important object to achieve the general object of the invention by the provision of an inertia hammer member having a free twisting movement in an upward direction, and an operative twisting movement in a downward direction responsive to the reciprocable motion of the tappet unit.

Another object of the invention is to provide a mechanical valve tappet of the self-adjusting type wherein two body members are normally movable relatively to each other to a limited extent through a predetermined cold-engine "operating clearance" therebetween to compensate for thermal changes in the engine and related parts, said members being interlocked for conjoint movement by dissipating said operating clearance during each valve operating cycle.

A further object is to provide novel means for lubricating the valve lifter of the present invention in a manner to provide quiet and efficient operability thereof. To this end, oil passageways are provided for the interfitted body parts and associated inertia hammer adapted not only to efficiently lubricate it and the mechanism associated therewith, but also effective to relieve the tappet of all compression effects, whereby a full twisting impact force of the hammer is assured at all times for uniform operation of the tappet unit.

It is another object of my invention to provide an automatically adjustable, mechanically-operable valve tappet assembly in the form of a self-contained unit, thus facilitating the disposition thereof in an engine between the camshaft and the lower extremity of the push rod or valve stem of a conventional poppet-type valve.

Another object of the invention is to provide a new and novel valve tappet unit in which novel automatic compensation for wear in the components of the valve-actuating system eliminates the need for manual tappet adjustments.

Objects and advantages not specifically set forth hereinbefore, will be noted in the course of the detailed description of the invention to follow with reference to the accompanying sheet of drawings, wherein the preferred and slightly modified embodiments are illustrated as follows:

Figure 1 is a fragmentary view, partly in elevation and partly in section, of a conventional V-type internal-combustion engine and its valve drive linkage, the view demonstrating the disposition of the present self-adjusting tappet assembly between the engine camshaft and the lower end of the push rod included in said linkage;

Figure 2 is a longitudinal sectional view on an enlarged scale through the tappet assembly taken substantially on the line 2—2 of Figure 1, with the camshaft positioned 90° to the plane of the longitudinal section;

Figures 3 and 4 are views similar to Figure 2, exhibiting further changed status of certain parts of the tappet assembly responsive to rotation of the engine-driven cam in the direction of the arrow to inaugurate the valve opening and closing phases of the tappet cycle;

Figure 5 is a fragmentary longitudinal view of Figure 1 on an enlarged scale showing details of the driving and driven members comprising the friction clutch means between the inertia weight and elevating screw;

Figure 6 is a transverse sectional view taken along the line 6—6 of Figure 5 looking in the direction of the arrows;

Figure 7 is a fragmentary longitudinal view illustrating a slightly modified form of the invention wherein a torsional power spring is energized by movement of the inertia weight in one direction for subseqent unwinding in the opposite direction to transmit rotative movement via novel one-way clutch means and friction clutch means to elevate the adjusting screw;

Figure 8 is a transverse fragmentary section taken along the line 8—8 of Figure 7 showing details of the lost-motion connection between a pair of the interfitting cup-like members and the power spring connection to the inertia driven cup-like member; and Figure 9 is a modified helical slot and pin connection between the inertial driving members for incorporation in either of the two principal embodiments of the present invention.

In the several views identical parts or elements are designated by like reference characters distinguished, however, by the addition of the letters "a" (Figs. 7–8) and "b" (Fig. 9) to each.

Referring now to the drawings, and particularly to Figure 1, the self-adjusting tappet assembly comprising the present invention is designated in its entirety by the letter "T," is shown incorporated in a conventional V-type internal-combustion engine "E" having a plurality of poppet valves one of which is shown at 10. A valve drive train or gear, indicated generally at "VT," is provided for each valve of the engine, and is conventional in all respects except for the valve tappet mechanism of the present invention, which is embodied therein. The valve drive train VT extends between the valve 10 and the camshaft 12 of the engine. The valve 10 may be of any known construction and that selected for illustration includes a stem portion 14 guided in a sleeve part 15, and having normally preloaded spring means 16 acting thereon normally tending to seat (close) the valve. A rocker arm 17 pivotally mounted intermediate its ends on a suitable rock shaft 18 is adapted to bear at one end 19 thereof against the free end of stem 14 when rotated in a counterclockwise direction, as viewed in the figure, to open valve 10 against the force of spring means 16. The other end 20 of the rocker arm 17 has a hemispherical recess, not shown, in its under surface to accommodate the upper end of a push rod 21, the lower end of which bears against a dished fitting 22 disposed in the upper hollow of the valve tappet T, which will be later described.

The valve tappet, which is generally cylindrical in contour, is illustrated as slidably mounted in a bore 24 radially disposed, in respect to the axis of the camshaft 12, in the block of the engine E so that the inner end of the tappet T bears on the surface of the cam 25 allotted thereto.

Referring now to Figure 2 for a more complete understanding of the construction and functioning of the valve tappet T, it will be seen that each of these comprise as a first principal element an outer body member or piston 26 having a working fit in the bore 24 in the engine block, a longitudinal cylindrical bore 28 closed at the bottom to form an end wall 29 which is adapted to bear on the surface of the cam 25 as seen in the figure, a medially disposed coaxial counterbore 30 merging with the longitudinal bore to form an internal annular shoulder 31, an end counterbore 32 merging with the medial counterbore 30 to form another annular internal shoulder 34, an internal annular groove 35 adjacent the outer end of the counterbore 32 and spaced from the annular shoulder 34, and a split retainer ring 36 engaging said annular groove. The second principal element of the tappet comprises an inner body member or plunger 38 having an inverted cup-like member 39 centrally depending from a circular flange or base 40, the peripheral surface of the latter sliding with a substantially oil-tight fit in the end counterbore 32 between the annular shoulder 34 and split retainer ring 36 and normally spaced predeterminately from said shoulder in engagement with said ring to provide what may be termed a cold-engine "operating clearance" designated "OC," capable of modulating, to reduce said space, responsive to thermal changes in the engine block and associated valve operating parts, an annular internal groove 41 adjacent the open end of said cup-like member and a split retainer ring 42 engaging said last-mentioned groove. Upon the "operating clearance" being taken up, the tappet T functions as a solid element to cause lift of the valve train VT by the cam 25 acting on the bottom of the end wall 29 of the outer member 26 as will appear.

Friction clutch means, generally designated "FC," are operatively incorporated in the inverted cup member 39 and comprise: a telescopically-related cup-like driving member 44 disposed in the cup member 39 between the retainer ring 42 and end wall 45 thereof for rotative movement only relatively to the member 39, a circular driven flange 46 having a plurality of circumferentially spaced pins 47 radially projecting from the peripheral surface thereof, and a split expansible friction ring 48 having a corresponding number of holes 49 similarly spaced for receiving said pins to support the friction ring on the flange for movement therewith, said flange and ring being interfitted in a cylindrical longitudinal bore 51 open at one end and closed at the other to form an end wall 52 in the cup member 44 with the expansible ring in frictional engagement with the surface of the bore 51 to provide a friction driving connection therebetween.

Novel inertia means generally designated "IM," are operatively associated with the driving member 44 and comprise: a cylindrical stem 54 depending centrally from the end wall 52 into the bores 28, 30 in the outer body member 26, a sleeve-type hammer or weight member 55 slidably disposed on said stem member, a pin 56 radially projecting from the cylindrical surface of the stem member, and a helically formed slot 57 medially disposed through the wall of the hammer sleeve 55 with one side of said slot merging with an angular camming surface 58 terminating at the lower end of the hammer sleeve. This camming surface cooperates with said pin to form a one-way working connection therebetween whereby as the hammer ascends on the stem member 54 the helical slot imparts a clockwise idle rotation thereto relatively to the stem, as viewed from the bottom, best demonstrated in Figure 5, and brings the camming surface 58 into operative disposition with respect to the pin 56 to enable the downward throw of the inertia sleeve to act on the pin 56 and thus turn the stem member 54 in a clockwise direction to rotate the driving member 44 of the friction clutch means FC, responsive to reciprocable tappet motion.

Upstanding from the central portion of the driven flange 46 is an externally threaded shank 60 which projects through a coaxial internally threaded central opening 61 in the plunger flange 40, the outer end of said shank being terminated with the aforesaid dished fitting 22 whereby any existent backlash in the valve drive linkage may be compensated for by elevating the threaded shank responsive to inertia-produced torque transmitted by the friction clutch FC.

A normally preloaded dished washer spring 62 is operably disposed between the shoulder 34 and the under marginal face portion of the plunger base 40 to resist closure of the operating clearance OC responsive to thermal changes in the engine while operating. A normally preloaded helically formed spring 64 is operably disposed between shoulder 31 and under marginal face portion of the plunger flange 40 to supplement the action of the washer spring 62 to elongate the piston elements 26, 38 relative to each other. A star-shaped leaf spring 66 is mounted atop the inertia weight 55 in encircling relation on the stem member 54, and comprises: a circular ring web 67 and a plurality of circumferentially spaced legs 68 radially projecting from said web at an angle with respect to the plane of the web portion. This latter spring serves the purpose of cushioning the inertia hammer at the limit of its upward throw (Figure 4) wherein it becomes operatively energized due to deformation of the legs resulting from the web portion engaging the under side of the driving member end wall 52, to accelerate the weight 55 in its downward throw thus adding to its impact force to turn the stem member 54.

The coaxially disposed bores aforesaid in the body members 26, 38 are constantly supplied with a quantity of overflow oil from the pressure lubricating system of the engine E, the pump (not shown) of the system providing oil through a suitable passageway 70 in the engine block to external annular channel 71 on the outer body member, a port 72 through the wall of the channel, thence through the medial counterbore 30 to the longitudinal bore 28 for exhaustion through another port 73 near the bottom of the normal wall of the outer piston member 26, into the oil sump (not shown) for recirculation as is well understood. Accordingly, the present tappet mechanism is efficiently lubricated at all times to provide silent and uniform functioning with minimum wear on the parts.

The engine-driven cam 25, in conventional fashion, includes a concentric base circle portion 75, an opening ramp 76 and a closing or release ramp 77, both merging with the base circle with their opposite ends forming the eccentric lobe with an apex 78 which establishes the maximum lift point of the cam.

OPERATION

The operation of the valve tappet mechanism T of the first embodiment (Figures 1-6) is as follows:

With the engine valve 10 in closed position, the various elements of the mechanism assume the relative positions illustrated in Figures 1 and 2. Here the helical spring 64 between the tappet body 26 and plunger 38 expands the tappet length between the shoulder 34 and retainer spring 36 to normally spaced relationship to establish the cold-engine operating clearance OC in condition to compensate for thermal expansion and contraction of the engine block and associated valve drive linkage VT during operation of the engine. Cooperating with the helical spring 64 is the dished spring washer 62 resisting closure of the operating clearance aforesaid. Assuming that no backlash is present in the valve drive train VT, the adjustable shank 60 is positioned relatively to the tappet assembly to cause the lower end 29 of the tappet outer body 26 to bear on the base circle 75 of the cam 25 with the engine valve closing spring means 16 fully effective to properly seat said valve since the combined biasing action of the tappet springs 62, 64 is less than the force of the spring means 16.

As the cam 25 rotates in the direction of the arrow as viewed in the figures, the opening ramp 76 (Figure 3) operatively engages the under end face of the tappet body 26 and begins to lift the same either with a quick lift, if the cam is designed for the conventional hydraulic valve tappet, or with a slower more gentle lift if the cam is especially designed for tappets of the type of the present invention. Under these circumstances the movement of the tappet unit T being resisted by the engine valve spring means 16 through the push rod 21, tends to compress the tappet springs 62, 64 to form a solid connection between the washer spring 62 and cooperating shoulder 34 and plunger flange 40 to fully dissipate the operating clearance OC therebetween to cause the parts of the tappet T to move in unison and lift the engine valve 10 as if a solid tappet were in place. The engine valve train clearance having been substantially zore external to the cold-engine operating clearance within the tappet at the position indicated in Figures 1 and 2 because of the expanding action of the springs 62, 64 and relatively adjusted position of the threaded shank 60 between the two tappet parts 26, 38, the action in operating the valve drive train VT is that of a mechanical lifter with substantially zero-lash present.

When the cam opening ramp 76 initially strikes the under end face of the tappet assembly all parts associated therewith are given a rapid upward thrust including the inertia weight 55 unrestrained in its movement on the stem member 54 so that the weight 55 moves to the positions of Figures 3 and 4 wherein the cushioning or snubber spring 66 is operatively compressed. These conditions hold at least until the cam reaches its position of maximum lift which may be visualized as an intermediate position between the Figures 3 and 4 positions. As a result of this upward throw of the sleeve hammer 55, the helical slot therein has rotated the hammer relatively to the stem member in a clockwise direction as viewed from the bottom in Figure 4 and positioned the camming surface portion 58 to subsequently act on the pin 56 during the downward throw of the inertia weight, thus quiet operation of the valve drive train VT for this part of the cycle has been effected with substantially zero backlash present.

From the foregoing it should be manifest that the invention provides an ingenious disposition and interrelation of elements adapted to automatically adjust themselves into a rigid assembly for operating the valve stem 14 against the force of spring means 16, whereby to dispose the valve 10 in fully open position as the apex 78 of cam 25 passes the central region on the bottom wall 29 of piston member 26.

As the cam 25 revolves in the direction of the arrow from the maximum lift point 78 to the release or closing ramp 77, the tappet unit T is lowered and with it the engine valve 10 is closed by action of the spring means 16, the initial closing movement of the tappet being portrayed in Figure 4. Under these circumstances the downward movement of the tappet T leaves the inertia weight 55 lifted in the Figure 4 position maintaining the cushioning spring 66 energized. Here conditions reverse themselves, the downward movement of the tappet ceases, the inertia of the weight 55 is no longer sufficient to overcome the expanding action of the spring 66 and influence of gravity, and moves rapidly downwardly causing the camming surface 58 to strike the pin 56, and thus drive the stem member in a clockwise rotative direction as viewed from the bottom in the figure. At the same time springs 62, 64 are so rated that at periods of rest their combined expansive action is sufficient to restore the operating clearance OC to the extent of thermal change in the engine E without affecting the full seating of the valve 10 by its spring means 16.

With the valve 10 fully seated and the lifter unit T and its included elements returned to their normal disposition exhibited in Figure 2, the next valve opening cycle is conditioned for repetition. It should be observed, that in the course of the final quarter revolution substantially of the camshaft 12 which includes the closing ramp 77 and a base circle portion of cam 25, the oppositely biasing force of the compression springs 62, 64 is effective following full seating of the valve 10, to restore the operating clearance OC between the piston 26 and plunger 38 requisite for thermal compensation to lengthen or shorten the aforesaid tappet body members relatively to each other within the limits of the normal operating clearance therebetween. During base circle engagement of the tappet unit, the parts 38, 60 are operative to adjust relatively to each other in a lengthening direction only to compensate for any existent backlash between the parts comprising the valve drive linkage VT without modifying the existent operating clearance, and upon cold-engine status becoming effective, the resultant contraction of the valve drive parts and engine block enables the springs 62, 64 to restore this clearance to normal as portrayed in Figure 2.

If backlash or lost-motion has been introduced in the valve drive gear VT due to impact wear between the parts, the clockwise turning movement of the stem member 54 by the inertia sleeve 55 is transmitted via the driving member 44 and driven member 46 to the shank 60 equipped with righthand threads to cause the shank to lengthen the tappet body parts relatively to each other between the engine cam 25 and push rod 21 to compensate for all backlash in the valve actuating system. However, it is to be made clear that during a valve opening cycle which additionally energizes springs 62, 64 within the tappet and the valve closure spring 16, elevation of the threaded shank is prohibited since the frictional coefficient obtaining between the driven friction ring 48 and driving member 44 is insufficient to turn the shank when under spring load, therefore, a slipping engagement ensues causing the friction clutch driving and driven members to rotate relatively to each other notwithstanding with each valve opening cycle the inertia member 55 operates to rotate the stem driving member 54 in the manner above-described. It is thus seen that the torque transmission from the twisting action of the inertia means IM by the friction clutch FC is effective to turn the threaded shank 60 only when it is freed of spring load due to the presence of backlash in the valve actuating system external to the requisite operating clearance aforesaid.

With the functioning of the first embodiment Figures 1–6 of the invention, it is clear that maximum efficiency of the mechanical valve tappet is assured under all operating conditions, and that substantially zero-lash is achieved in the valve drive gear VT during the full valve opening and closing cycle. With the engine valve 10 opening and closing once per cycle of tappet reciprocable movement, careful modulation for thermal changes in the engine block by the operating clearance OC and backlash adjustment of the whole valve drive train are achieved that many times, so that the backlash is maintained as near zero as is feasible and desirable, all with the addition of only a few very small and low priced parts to what has been considered as the normal or commercial type of hydraulic compensating valve tappet. Backlash being eliminated by lengthening the tappet parts 38, 60 relatively to each other, said parts resisting adjustment to lengthen when under spring load during the tappet cycle to open and close the engine valve 10, thereby preventing over-adjustments in the valve drive train VT tending to hold the engine valve 10 slightly open causing reduced engine efficiency accompanied by overheating of the valve and cooperating seat.

*Power-spring backlash control and operation*
*(Figures 7 and 8)*

In the modified embodiment depicted in Figures 7 and 8, wherein parts analagous to those already described are designated by like reference characters distinguished, however, by the addition of the letter "*a*" to each as previously stated, only closely associated structure of the tappet T is shown, and it may be assumed that otherwise the components correspond to those of the embodiment first disclosed.

A primary cup-like driving member 80 is telescopically disposed in the inverted cup-like member 39a, and comprises: a cylindrical member 81 having a longitudinal bore 82 closed at one end to form an end wall 83 integral with the stem member 54a, and open at the other end, said members being maintained in unison axial relation by the retainer ring 42a engaging the annular groove 41a while accommodating relative rotative movement of the member 80 with respect to the member 39a, and a circular ring configuration of radially disposed one-way drive ratchet teeth 85 are formed on the inner face of the end wall 83, each of said teeth having a vertical working shoulder 86 and an angular ramp portion 87 interconnecting said shoulders, said member 80 also including a normal diameter portion 89 having a slidable fit with the inner cylindrical surface of the inverted member 39a, a reduced diameter portion 90 forming an external annular shoulder 91 therebetween, and a substantially rectangular cutout 93 in the portion 89 to the depth of the shoulder 91.

A secondary cup-like driving member 95 is interfitted within the primary driving member 80 in longitudinally spaced relation from the inner face of the end wall of the inverted member 39a, and comprises a longitudinal bore 96 closed at one end to form an end wall 97, and the other end open, and a complemental series of ratchet teeth 99 engaging the ratchet teeth 85 on the driving member 80 to form a one-way drive ratchet clutch "RC" therebetween, said friction clutch means FC$^a$ being operatively incorporated within the longitudinal bore 96 of the member 95 for frictionally elevating shank 60a in an opposite direction to that of the first embodiment, and therefore, said shank carries lefthand threads cooperating with similarly formed internal threads in the opening 61a to lengthen the parts 38a, 60a relatively to each other to compensate for backlash in the valve drive train VT$^a$.

A normally preloaded compression spring 101, preferably of conical configuration, is operably disposed between the driven flange 46a and the inner face of the endwall 97 of member 95 to maintain the teeth of the ratchet clutch RC in operating engagement for unison one-way rotation and accommodating relative disengaging movement therebetween in the opposite direction. A torsional power spring 103 wound in a counterclockwise direction around the portion 90 and disposed between the shoulder 91 and opposite marginal face portion of the inverted member end wall with its lower downturned end 104 engaging a vertical wall of the rectangular cutout 93 and its upturned opposite end 105 anchored in a hole 106 formed in the inverted member end wall to thus operatively connect the inverted cup member 39a and driving member 80 with the spring 103 normally slightly tensioned. A stop pin 108 press-fitted through a hole 109 in the wall of the inverted cup member 39a normally engages the opposite vertical wall of the cutout to limit relative rotation of the driving member 80 with respect to the inverted cup member 39a to wind the torsional spring into operative energized condition and maintain its pretensioned status, responsive to turning movement of the stem member 54a by the aforesaid action of the cooperating inertia hammer 55a.

The operation of this modified backlash adjusting mechanism differs from that of the first embodiment in that the twisting force imparted by the inertia weight 55a in a clockwise direction is stored up in the power spring 103 which subsequently unwinds to rotate the driving members 80, 95 via the one-way ratchet mechanism RC in a counterclockwise (leftward) direction to elevate the shank 60a should a backlash condition be present in the valve drive system VT$^a$.

Preferably the power spring 103 is slightly pretensioned in its normal status portrayed in Figure 7 and additionally energized by the action of the downward throw of the inertia sleeve 55a. Upon the tappet T$^a$ reaching the base circle 75a of the cam 25a, springs 62a, 64a expand together with the action of the valve closure spring means 16a to reestablish the operating clearance OC$^a$ according to the thermal expansion of the engine E$^a$. At this point, with the tappet in the position of Figure 2, should backlash exist in the valve drive parts, the energized power spring 103 is capable of unwinding thus rotating the pair of driving members 80, 95 in a counterclockwise direction to impart a like rotation to the threaded shank 60a via the friction clutch means FC$^a$ to lengthen the parts 38a, 60a relatively to each other to compensate for such backlash condition. However, upon the tappet T$^a$ reaching the valve closed position of Figure 2 with no backlash existent, the expanding action of the springs 62a, 64a is sufficient to resist rotation of the threaded shank 60a supplemented by the spring means 16a, and thus prevent over-adjustment in the valve drive train VT$^a$ by the unwinding action of the power spring 103 despite energization of this spring with each valve opening cycle responsive to the downward throw of the inertia means IM$^a$ in the manner previously explained in connection with the first embodiment.

Further considering the operational behavior of this modification with respect to the coaction of the inertia hammer 55a which imparts a clockwise rotational movement to the stem member 54a integral with the bottom wall of the primary driving member 80 and displaces the right vertical wall of the rectangular cutout 93 from the stop pin 108 and the left vertical wall in engagement with the downturned end 104 of the power spring 103 acts to wind this power spring in a clockwise direction as viewed from the bottom in the figures, with the ratchet mechanism RC over-running to prevent the spring energizing throw of the inertia sleeve from retracting the adjusting shank 60a. This twisting action on the power spring responsive to inertial action energizes it, and at the instant the piston body member 26a engages the base circle 75a of the engine-driven cam, at which point the downward thrust of the inertia hammer 55a has been dissipated, the loaded torsional spring 103 unwinds to normal status as depicted in the two figures which brings the right vertical shoulder of the cutout 93 into engagement with the stop pin 108 and simultaneously imparts a counterclockwise rotation to the driving member 80 and inertia member 55a, thence to the clutch driven member 46a via the engaged shoulders 86 of the ratchet mechanism RC to elevate the lefthand threaded shank 60a to take up any excessive backlash that may exist in the valve drive parts VT$^a$.

The ratchet teeth 85, 99 comprise a series of closely generated radially disposed elements in circular ring configuration as aforesaid, adapted to interengage in normal disposition to drive the driven member 46a in a counterclockwise direction only, and accommodate disengagement of these teeth to prevent fortuitous retraction (lowering) of the shank 60a during the downward throw of the weight 55a. It is important to point out here that the stop pin 108 is employed only where a pretensioned condition of the power spring is employed, and the invention further contemplates that the camming surface 58a on the inertia sleeve 55a may be dispensed with to produce a full helically formed slot 110 from end to end (see Figure 9). This latter type of helical slot cooperating with the pin 56b to impart a back and forth twisting motion to the weight 55b which carries through to the stem member 54b and related parts and as a result the over-running action or disengaging of the ratchet teeth 85, 99 prevents this motion induced by the reciprocable throw of the weight from being effective to turn the clutch driven member 46b in a lowering direction, with the stop pin 108 eliminated. In this latter arrangement eliminating the stop pin 108, it is preferred that the cutout 93 be narrowed to snugly confine the downturned end 104 of the power spring 103 whereby turning movement of the upward throw of the inertia member 55b is prevented by the resistance of the spring coils to unwrap from fully relaxed condition and therefore, even though the rotative action on the shank 60b is counterclockwise tending to elevate it, the thrust on the threads of the shank by the spring means 16b combined with the resistance to unwrapping of the spring coils serve to stabilize the shank in its preadjusted status, at the same time the downward thrust of the inertia member energizes the power spring 103 for release as the tappet unit T$^b$ engages the base circle 75ᵇ of the cam 25ᵇ to elevate the shank for any backlash compensation required to maintain silent and efficient operation of the valve operating system.

It is, therefore, desired to make clear that the function of the ratchet teeth 85, 99 is to drive the adjusting shank 60a outwardly only via the friction clutch means FCᵃ, and by disengaging to eliminate any tendency of the spring energizing throw of the hammer 55a, whether the spring 103 be pretensioned requiring the stop pin 108 or normally relaxed eliminating the stop pin, imparting a reverse retracting action on the shank 60a which would operate to introduce excessive backlash in the valve drive train VTᵃ with consequent inefficient and noisy operation of the engine. The aforesaid spring unwinding tendency of the inertia sleeve 55a with or without the camming surface portion 58a of the helical slot 57a, is prevented by the stop pin 108. The aforesaid novel ratchet one-way drive mechanism RC between the primary and secondary driving members 80, 95, therefore function to prevent fortuitous operation of the tappet Tᵃ responsive to the reciprocable throw of the inertia member 55a which imparts oscillatory movement thereto induced by the helical slot and pin connection with the driving member 54a. In the disclosure as illustrated with the power spring 103 normally under slight tension, the stop pin 108 is requisite to maintain this spring in such pre-loaded condition and which in turn prevents any turning movement of the sleeve member 55a during its upward throw.

The space between the upper end of the secondary member 95 and inner face confronting portion of the end wall of the inverted up member enables the cooperating ratchet teeth to cam along their interconnecting ramps and thus raise and lower out of and into engaging relation with respect to their complemental vertical driving shoulders 86, to produce in effect a disengaging or overrunning non-drive action. The conical spring 101 always influences the ratchet teeth into normally engaged relation with respect to their complemental driving shoulders for effective one-way drive counterclockwise rotation to effect backlash adjustments in the manner above explained.

OPERATIONAL SUMMARY

In both embodiments of the invention, backlash adjustments are responsive to the downward throw of the inertia means IM, whether such adjustments are effected directly by the inertia means IM as in the case of the first embodiment Figures 1–6, or via the power spring 103 energized by said inertia means; while compensation for thermal conditions is provided by the modulation of the operating clearance OC accommodated by the compression of the springs 62, 64. Therefore, the lifter adjustments as required; i. e., shortening or lengthening of the valve drive gear to compensate for thermal changes only is provided by the clearance mechanism OC, which backlash compensation is in one direction only to lengthen the tappet assembly responsive to the inertia-driven screw 60, the latter being prohibited from adjusting during tappet reciprocable motion. The cold-engine operating clearance is established by operating and design characteristics of the engine, and when this clearance is taken up due to resistance by the spring means 16 the principal tappet elements operate as a solid body to open the selected engine valve 10, and upon closure of the engine valve, springs 62, 64 expand to restore the clearance OC to the status corresponding to the thermal expansion of the parts and engine block. When the engine assumes cold status, the fully predetermined operating clearance is automatically restored within the tappet T for subsequent reduction as the engine heats up, and as long as this clearance is modulated from its normal status, elevation of the adjusting screw 60 cannot be effected and as a consequence the friction clutch means FC operate in slipping engagement with each downward throw of the inertia sleeve 55 until such time as backlash enters the valve drive parts due to impact wear as is understood.

As previously pointed out, the present invention contemplates use of a true helically formed slot 110 (Figure 9) in the inertia sleeve 55b, in lieu of the illustrated slot 57 or 57a formed on one side with a straight angular camming surface 58 and 58a respectively which flares the open end of the helical path, the latter arrangement providing uni-directional effectiveness on the stem member 54 via pin 56. That is to say, that while the sleeve 55 is given a back and forth twisting motion during each tappet cycle, only the downward throw of the sleeve is effective to carry through to the stem member to elevate the shank 60 where backlash is present in the valve drive gear VT. In the case of a full helical slot 110, the back and forth twisting motion of the sleeve member 55b carries through to the driving member 54b, but the upward throw while tending to turn the driving member 54b cannot act on the shank 60b for the reason that the threaded connection of the latter with the plunger member 38b is under maximum thrust from the valve closure spring 16b causing the friction clutch FCᵇ to slip should the force of the inertia sleeve be sufficient to drive the member 54b relatively to the driven member 46b. Accordingly, both embodiments of the instant invention are operative with either type of inertia member construction above-described whether the upward throw thereof is idle relatively to the member 54 or acting to turn the latter member, while the downward throw in both arrangements acts to adjust the mechanism T for any backlash present in the valve drive system.

Since the design of the helical slot 57 or 57a is critical with respect to its cooperating pin 56, where the flared open end of this slot is employed, it is important to observe that the helically formed closed end portion of this slot tends to give the inertia sleeve 55 limited clockwise turning motion relative to the driving member 54 with the inauguration of the upward throw thereof which motion carries through to the stem member 54 via the pin 56, but being only momentarily effective the stem remains substantially stationary. At the moment the upward travel of the sleeve 55 brings the flared portion 58 of the slot into registry with the pin 56, the aforesaid tendency of clockwise relative movement of the sleeve disposes the working surface 58 for effective engagement with the pin during the downward throw of the inertia member 55 to impart a clockwise turning movement to the driving member 54 for backlash adjustments in the manner fully described above. The inertial straight line descending movement of the member 55 supplemented by the expansion of the snubber spring 66 causes the angular working surface 58 to act on the pin 56 to give the latter a clockwise direction of relative rotation. In the case, however, where the working surface 58 is eliminated to produce the modified helical slot 110 with uniform width throughout its full length, the coaction of this slot and pin 56b imparts a back and forth twisting motion to the stem 54b with each reciprocable movement of the inertial member 55b, with the upward action ineffective to adjust the shank 60b during a valve opening cycle notwithstanding the stem 54b may rotate and slip the friction clutch means FCᵇ.

It is thus seen that flexibility of design is provided for the incorporation of the inertia mechanism IM in the present tappet T so that proper operating characteristics may be provided for the particular type of engine in which the tappet is to be embodied. Either type of operating connection between the inertia member 55 and driving member 54 may be incorporated in the two embodiments of the present invention, with the helical slot and cam 57, 58 and pin 56 effective on the driving member during the downward throw of the inertial sleeve to compensate for backlash (first embodiment Figures 1–6), or in the case of the modification (Figures 7–8) to energize the power spring 103 which in turn is rendered effective to make said backlash compensations. In the case where the modified full length helical slot 110 is employed, the upward throw of the inertial hammer would be idle through the slipping engagement of the friction clutch means FC$^b$ while the descending impact movement would be effective to either directly elevate the shank 60$b$ or indirectly induce such shank adjustments via the energized power spring 103$b$, should a backlash condition be present in the valve drive gear VT$^b$.

It is further important to note that the helical spring 64 may be dispensed with without impairing the operativeness of the tappet by increasing the weight of the spring washer 62, or the latter spring may be eliminated by increasing the weight of the helical spring 64, since the principal body elements 26, 38 operate as a solid body when the clearance OC is fully taken up.

It will also be noted that two elements; namely, parts 38, 60 operate to eliminate backlash only and both function relatively during the time that the tappet is riding the base circle of the cam 25.

In installing the valve lifter mechanism T of the present invention in the valve drive train of an engine, it makes no difference whether the engine be hot or cold during installation providing the adjustable shank 60 is free of thrust from the spring means 16 with the engine valve fully seated, any under-adjustment is readily compensated for and eliminated by the automatic operation of the valve lifter of the present invention.

The present invention is particularly adapted to be utilized in the replacement of all valve tappet mechanisms whether mechanical or hydraulic. While it is preferred that the cam design be conventional, as shown in the drawing, it is clear that the present invention will operate satisfactorily with the particular cam design presently used for commercial hydraulic valve tappets where the opening ramp gives a rapid rise to the tappet in order to provide the hydraulic impact to insure closing of the tappet check-valve substantially at the instant of initial tappet lift.

Considering the terminology used in the foregoing description and in the appended claims, the identifying expressions and/or terms employed are intended to convey meanings which include the range of reasonable equivalents in the patent sense. For example, the expressions "wear," "backlash," and "lost-motion" are intended to convey similar meanings with respect to excessive idle travel within the valve drive gear, while such expressions as "operating clearance," "limited relative movement," "initial movement," "axial movement," etc. relate to the operating movement within the tappet mechanism as is understood. The terms "upper," "upward," "elevate," "lower," "bottom," "vertical," "project," "outer," "inner," "top," and other directional words or characters are intended to have only relative connotation for convenience in describing the structure as illustrated in the drawings, and are not intended to be interpreted as establishing a definite position of the tappet mechanism or as requiring any special orientation with regard to associated structure external to the present disclosure.

It will be apparent that various changes, modifications and rearrangements can be made in the particular apparatus described herein without departing from the scope of my invention. Obviously one body member of the tappet need not be arranged within the other and the various parts and elements of the construction may be redesigned to fit particular installations or designs, and obvious substitutes may be used for the various parts shown.

From the preceding description augmented by an inspection of the drawing, it is believed that a comprehensive understanding of my invention may be had. However, it is to be understood that the precise details of structure illustrated and described shall not be construed in a limiting sense, the invention contemplating all modifications and substitutions of equivalent structure which may fall within the purview of the subjoined claims.

Having thus described my invention, I claim:

1. In a mechanical compensating tappet for operating the valves of an internal-combustion engine, comprising: a pair of telescopically-related relatively movable cylindrical body members each having a longitudinal bore closed at one end to form an end wall and open at the other; an internal annular shoulder formed adjacent the open end of one of said body members; a circular flange on the other body member normally spaced from said shoulder to provide a predetermined cold-engine operating clearance between said body members; an annular internal groove formed in the surface of the longitudinal bore of the one body member adjacent its open end; a split retainer ring engaging said internal groove for abutment by an overlying peripheral marginal portion of the flange aforesaid to establish said operating clearance; friction clutch means having a driving and driven member telescopically disposed in the longitudinal bore of the other body member; a split retainer ring engaging an internal annular groove adjacent the open end of the other body member bore for preventing axial displacement of the clutch driving member and accommodating relative rotative movement thereof; a cylindrical stem member depending centrally from the clutch driving member into the longitudinal bore of the one body member; inertia means responsive to tappet motion including an element movably disposed on said stem member and having an operative connection therewith to rotate said driving member in one direction; a dished spring washer operably disposed normally under tension between the annular shoulder and opposite side of the marginal portion aforesaid for resisting closure of said operating clearance; a one-way extensible element projecting through the end wall of the other body member and having its inner end secured to the clutch driven member; a spring-loaded valve actuating element engaging the outer end of said extensible element to resist one-way turning movement thereof to project it while under spring load with the operating clearance aforesaid fully taken up during the tappet cycle; and an engine-driven cam for imparting reciprocable motion to said tappet to open and close a selected engine valve.

2. The mechanical compensating tappet according to claim 1 including a normally preloaded helically formed compression spring operably disposed between the pair of body members for elongating them relatively to each other and supplementing the action of the dished spring washer.

3. The mechanical compensating tappet according to claim 1 in which the clutch driving and driven members comprise a cup-like cylindrical member and an annularly spaced interfitting circular flange respectively, and a radially expansible friction ring carried on and encircling the periphery of said flange in frictional engagement with inner cylindrical surface of the cup-like member.

4. The mechanical compensating tappet according to claim 3 in which the movable element of the inertia means is a sleeve-type weight slidably mounted on the cylindrical stem member, and operatively connected thereto by a radially projecting pin carried by the stem member and a helically formed slot through the lower end wall of said weight whereby the downward throw of the weight is effective to rotate the cylindrical stem in one direction.

5. The mechanical compensating tappet according to claim 4 including a normally relaxed star-shaped leaf spring provided with a central opening encircling the cylindrical stem atop the inertia weight for movement therewith into engagement with the confronting side of the end wall of the cup-like member whereby the upward throw of the weight is cushioned and the spring simultaneously energized for subsequently accelerating the downward throw of said weight to rotate the cylindrical stem as aforesaid.

6. The mechanical compensating tappet according to claim 5 in which the one-way extensible element comprises a cylindrical rod with external threads engaging complemental internal threads formed in a circular aperture through the end wall of the other member whereby rotation thereof in said one direction elevates the rod relatively to said pair of body members to compensate for backlash only existing between the valve actuating element and engine valve.

7. The mechanical compensating tappet according to claim 1 in which the predetermined cold-engine operating clearance modulates to compensate for thermal changes only during engine operation.

8. The mechanical compensating tappet according to claim 7 in which the dished spring washer is capable of reestablishing said operating clearance to its compensating status with each valve opening cycle including cold-engine status thereof.

9. In a mechanical compensating tappet for operating the valves of an internal-combustion engine, comprising: an outer and an inner telescopically-related relatively movable body member, each having a coaxially disposed longitudinal cylindrical bore open at one end and closed at the other to form oppositely disposed end walls thereon; a counterbore in the outer member merging with its longitudinal bore to form an annular internal shoulder; a circular flange on the inner member slidably mounted in said counterbore and normally spaced predeterminately from said shoulder to provide a cold-engine modulatory operating clearance therebetween; a split retainer ring engaging an annular internal groove adjacent the outer end of said counterbore for abutment by the confronting peripheral marginal portion of the flange on the inner member to establish said predetermined operating clearance with respect to the shoulder on said outer member; an adjustable element threadedly incorporated in a central circular opening through the end wall of the inner member, the inner end of which having a circular driven flange; a plurality of circumferentially spaced support pins radially projecting from the peripheral face of said flange; a split radially expansible friction ring having a like number of circumferentially spaced holes for reception of said pins to enable unison movement therewith and accommodate relative radial movement with respect thereto; an inverted cup-like member carried by said inner member and projecting inwardly from the end wall thereof; a telescopically-related cup-like driving member having an end wall, rotatably mounted within said inverted cup member for reception of said expansible ring in frictional engagement with the inner cylindrical surface of said driving member; a split retainer ring engaging an annular internal groove adjacent the inner end of the inverted cup member for preventing axial displacement of the driving member relative thereto; a cylindrical stem member depending centrally from the end wall of the driving member; inertia means including an element movably mounted on said stem member, responsive to tappet motion for imparting rotative movement in one direction to said driving member tending to frictionally elevate the threaded element; a dished spring washer operably disposed normally under tension between the annular shoulder and opposite side of the marginal portion aforesaid for resisting closure of said operating clearance; a spring-loaded valve actuating element engaging the outer end of said threaded element to resist turning movement thereof in said one direction by the frictional engagement of the driving member with the driven flange while under spring load with the operating clearance aforesaid fully taken up during the tappet cycle; and an engine-driven cam for imparting reciprocable motion to said outer member to open and close the selected engine valve.

10. The mechanical compensating tappet according to claim 9 including a normally preloaded helically formed compression spring operably disposed between the two members for elongating them relatively to each other and supplementing the action of the dished spring washer.

11. The mechanical compensating tappet according to claim 9 including an overflow passageway from the pressure lubricating system of the engine communicating with an annular external channel on the outer body member, a first port through the wall of the channel connecting the latter with the interior of the outer member, and a second port spaced from the first port through the normal wall of the outer member for returning the overflow oil to the engine sump for recirculation.

12. In a mechanical compensating tappet for operating the valves of an internal-combustion engine, comprising: an outer and an inner telescopically-related relatively movable body member, each having a coaxially disposed longitudinal cylindrical bore open at one end and closed at the other to form oppositely disposed end walls thereon; a counterbore in the outer member merging with its longitudinal bore to form an annular internal shoulder; a circular flange on the inner member slidably mounted in said counterbore and normally spaced predeterminately from said shoulder to provide a cold-engine modulatory operating clearance therebetween; a split retainer ring engaging an annular internal groove adjacent the outer end of said counterbore for abutment by the confronting peripheral marginal portion of the flange on the inner member to establish said predetermined operating clearance with respect to the shoulder on said outer member; an adjustable element threadedly incorporated in a central circular opening through the end wall of the inner member, the inner end of which having a circular driven flange; a plurality of circumferentially spaced support pins radially projecting from the peripheral face of said flange; a split radially expansible friction ring having a like number of circumferentially spaced holes for reception of said pins to enable unison movement therewith and accommodate relative radial movement with respect thereto; an inverted cup-like member carried by said inner member and projecting inwardly from the end wall thereof; a telescopically-related cup-like first driving member having an inner end wall and rotatably mounted in said inverted cup member; a cylindrical stem member depending centrally from the end wall of the first driving member; a split retainer ring engaging an internal annular groove adjacent the inner end of the inverted cup member for preventing axial displacement of the first driving member relative thereto; inertia means including an element movably mounted on said stem member, responsive to tappet motion for imparting rotative movement in one direction to said first driving member; a second cup-like driving member telescopically disposed in normal axially spaced relation with respect to the first driving member for reception of said expansible ring in frictional engagement with the inner cylindrical surface thereof, and having the exterior of its end wall formed with a circular configuration of one-way drive ratchet teeth; complemental ratchet teeth formed internally on the end wall of the first driving member for engaging the first-mentioned ratchet teeth; a normally preloaded compression spring operably disposed between the driven flange aforesaid and inner face of the end wall of the second driving member for maintaining the ratchet teeth in operative relationship; a normally preloaded power spring encircling the first driving member and operably interconnecting the latter with the inverted cup member whereby limited rotational movement of the first driving member in said one direction operably energizes said power spring for subsequently imparting an opposite rotative movement to both driving members via the one-way connecting ratchet teeth tending to frictionally elevate the threaded element; a dished spring washer operably disposed normally under tension between the annular shoulder and opposite side of the marginal portion aforesaid for resisting closure of said operating clearance; a lost-motion pin and slot connection operably incorporated between the inverted cup member and first driving member for limiting relative rotative movement therebetween and establishing the preloaded status of said power spring; a spring-loaded valve actuating element engaging the outer end of said threaded element to resist turning movement thereof by said frictionally driven flange in said opposite direction while under spring load with the operating clearance aforesaid fully taken up during the tappet cycle; and an engine-driven cam for imparting reciprocable motion to said outer member to open and close the selected engine valve.

13. The mechanical compensating tappet according to claim 12 including a preloaded helically formed compression spring operably disposed between the two body members for elongating them relatively to each other and supplementing the action of the dished spring washer.

14. The mechanical compensating tappet according to claim 12 including an overflow passageway from the pressure lubricating system of the engine communicating with an annular external channel on the outer body member, a first port through the wall of the channel connecting the latter with the interior of the outer member, and a second port spaced from the first port through the normal wall of the outer member for returning the overflow oil to the engine sump for recirculation.

15. The mechanical compensating tappet according to claim 12 in which the power spring is the torsional type.

16. The mechanical compensating tappet according to claim 15 in which the cutout is of rectangular U-shaped configuration and receives the movable end of the torsional spring in engagement with one of its parallel marginal faces, and an aperture in the inverted cup member is provided for receiving the fixed end of said torsional spring.

17. The mechanical compensating tappet according to claim 16 including a helical slot having an angular camming surface portion and pin connection operably disposed between the inertia element and stem member whereby reciprocable throw of the inertia element responsive to tappet motion produces a back and forth twisting motion thereto which carries through to the stem member to rotate the latter in one direction only responsive to coaction of the camming surface with the pin.

18. The mechanical compensating tappet according to claim 17 in which the other parallel marginal face of the cutout normally engages the stop pin.

19. The mechanical compensating tappet according to claim 18 in which the torsional spring is normally pretensioned to releasably engage the other parallel marginal face of the cutout and the stop pin, which the outer tappet body is riding the base circle of the engine-driven cam.

20. The mechanical compensating tappet according to claim 16 including a helical slot and pin connection operably disposed between the inertia element and stem member whereby reciprocable throw of the inertia element responsive to tappet motion produces a back and forth twisting motion thereto which carries through to the stem member to correspondingly rotate the latter by coaction of the slot and pin.

21. The mechanical compensating tappet according to claim 20 in which the other parallel marginal face of the cutout is circumferentially spaced from the stop pin to render the limiting action of the latter ineffective.

22. The mechanical compensating tappet according to claim 21 in which the torsional spring is normally fully relaxed with the stop pin spaced from the other marginal face of the cutout, while the outer tappet body is riding the base circle of the engine-driven cam.

23. In a mechanical compensating engine valve tappet including a cam-actuated outer tappet body having a longitudinal bore closed at one end and open at the other: an inner body member reciprocably mounted in the tappet body bore and having a longitudinal bore coaxially disposed with respect to the first-mentioned bore and closed at one end and open at the other; an internal annular shoulder formed on the tappet body bore adjacent its open end; a circular flange on the exterior of the inner body member and normally predeterminately spaced from said annular shoulder; normally preloaded spring means operably disposed between the circular flange and tappet body for establishing said predetermined space as an operating clearance capable of modulation in response to thermal changes in the engine; a coaxially disposed threaded aperture through the closed end of the inner body member; an element projecting through said aperture in threaded engagement therewith for relative adjustment outwardly only with respect thereto; a circular member secured to the inner end of said threaded element; a primary driving member of cup-like configuration rotatable within the bore of the inner body member; a radially expansible friction ring carried by the circular member in continuous frictional engagement with the inner cylindrical surface of the driving member; a cylindrical element secured to and depending coaxially from the closed end of the driving member into the bore of the tappet body; a radially projecting pin carried by said cylindrical element; an inertia sleeve having a working surface portion and slidably mounted on the cylindrical element responsive to tappet motion for operatively engaging the working surface with the radial pin aforesaid to rotate the driving member in one direction upon completion of the tappet cycle whereby the threaded element is adjusted outwardly to compensate for backlash without disturbing the status of the operating clearance aforesaid.

24. The mechanical compensating valve tappet according to claim 23 including a secondary driving member of cup-like configuration telescopically incorporated within the said primary driving member, in continuous frictional engagement with said friction ring; a one-way drive clutch operably incorporated between said driving members for imparting unidirectional rotation to the secondary driving member from the primary driving member; a power spring connected to the inner body member and primary driving member to impart unidirectional rotation to the latter when energized, in response to movement of the inertia sleeve induced by completion of the tappet cycle to cause release of the energized power spring whereby the secondary driving member and threaded element are rotated in unison by the primary driving member via the friction ring to effect backlash adjustment in the manner stated.

References Cited in the file of this patent
UNITED STATES PATENTS

| | | |
|---|---|---|
| 2,704,057 | Randol | Mar. 15, 1955 |
| 2,751,896 | Moser | June 26, 1956 |